United States Patent [19]

Kousa

[11] Patent Number: 4,807,274
[45] Date of Patent: Feb. 21, 1989

[54] TELEPHONE LINE QUALITY TESTING SYSTEM

[75] Inventor: Paavo T. Kousa, Campbell, Calif.

[73] Assignee: Octel Communications Corporation, Milpitas, Calif.

[21] Appl. No.: 150,995

[22] Filed: Feb. 1, 1988

[51] Int. Cl.$^4$ .......................... H04M 3/08; H04M 3/24
[52] U.S. Cl. ............................................ 379/6; 379/97; 379/22; 371/22
[58] Field of Search ................... 379/6, 97, 22, 23, 32; 371/22, 25; 375/10

[56] References Cited

U.S. PATENT DOCUMENTS 3,508,144  4/1970  Mayer .................................... 379/22

Primary Examiner—Stafford D. Schreyer
Attorney, Agent, or Firm—Flehr, Hohbach, Test, Albritton & Herbert

[57] ABSTRACT

A telephone line quality testing system detects line echoes in the telephone connection between two subsystems in a message transmission system. The test for line echoes is performed while the two subsystems exchange identification data by transmitting DTMF signals in a predefined sequence. Each subsystem transmits a marker at the beginning of each DTMF transmission. This marker is constructed so that it can be distinguished, with absolute certainty, from any possible echo of the previous DTMF transmission by the other subsystem. In general, the marker includes at least one DTMF signal selected from the set of DTMF signals not included in the last X DTMF signals sent by the other subsystem. Each subsystem also generates an "Expected marker" that should precede the next DTMF transmission by the other subsystem. When receiving a DTMF transmission, each subsystem compares the initial DTMF signals received with the expected marker. If a match is found, the first DTMF signal which matches the expected marker is denoted as the beginning of the received packet and the DTMF signals preceding that signal, if any, are discarded as line echoes. If none of the initial (e.g., fourteen) signals received match the expected marker the call is terminated because a line quality problem has been detected.

12 Claims, 4 Drawing Sheets

TELEPHONE LINE QUALITY TESTING SYSTEM

The present invention relates to a telephone line quality testing system, and more particularly to a system and method for detecting echoes of DTMF signals in a telephone line quality testing system.

BACKGROUND OF THE INVENTION

In electronic mail, voice mail, and other information transmission systems that use telephone lines to transmit messages, it is important to test the quality of the telephone line being used. In other words, it is important to test the quality or clarity of the transmissions over the telephone line being used. If there are deficiencies in the transmission of a message because of the quality of the telephone line, there will naturally be undesirable results, including the distinct possibility that the message will not be received in the first place.

The assignee of this invention makes voice mail systems which can transmit verbal messages to specified persons or telephone extensions at remote locations. After a person has recorded a message and has specified the recipients of the message, the voice mail system automatically performs a series of steps to send the stored message to the specified recipients. This may occur immediately after the message has been recorded, or the system may transmit a large number of stored messages at a later time such as at night when telephone usage rates are low.

Referring to FIG. 1, there is shown a block diagram of a message transmission system 20 including a plurality of voice message systems 22, 24, 26 which are interconnected by telephone lines 30. For the purposes of this discussion, the VMS which places a call and initiates a message transmission is called the transmitting VMS, and the VMS which receives the call is called the receiving VMS. Each VMS in the message transmission system is also called a subsystem.

In many circumstances, after the transmitting VMS has transmitted one or more messages to the receiving VMS, the receiving VMS may then transmit one or more stored messages to the transmitting VMS. For this and other reasons, it is important that the telephone line quality be tested for transmissions in both directions between the two VMS's.

Referring to FIG. 2, when the transmitting VMS is ready to transmit one or more stored messages to a receiving VMS, the two subsystems engage in an identification and line testing procedure until a telephone line of acceptable quality is found. The identification procedure, often called a handshake protocol, is performed by exchanging DTMF signals to identify the transmitting system, to confirm the identity of the receiving system, and to identify the destination(s) of the message being sent. The line testing procedure is performed by testing certain aspects of the signals exchanged during the identification procedure. Thus the line testing procedure can be seen as either a second process performed in parallel with the identification procedure, or as a part of the identification procedure.

The feature of the handshake protocol which is relevant to this discussion is that while one VMS is transmitting DTMF signals, the other VMS is not only receiving the DTMF signals for the purpose of decoding the information being sent, it is also testing the DTMF signals received to determine if the line quality of the telephone connection between the two systems is adequate.

Terminology

For the purpose of this specification, the terms "telephone line" and "telephone connection" are defined to mean the series of connections between two systems such as systems 22 and 26 in FIG. 1. Thus the telephone line between VMS 22 and VMS 26 includes all of the components and transmission media between the two, regardless of whether these components include wires, satellites, switches, microwave transmitters and receivers, and so on.

For the purposes of this discussion, the terms "DTMF signal" and "DTMF tone" are used interchangeably to refer to any one of the sixteen standard predefined dual-tone signals generated by standard DTMF signal generators. On the other hand, the term "DTMF" transmission is used to refer a packet or contiguous set of DTMF signals used in the present invention during the handshake protocol to transmit one piece of information from on subsystem to another.

S/N Ratio Test

A prior art system, made by the assignee of the present invention, tests line quality by indirectly testing the signal to noise ratio of the telephone line during the handshake protocol. In particular, the prior art system compares the amplitude of received DTMF tones with the amplitude of "silent" periods between DTMF tones. If the ratio of these amplitudes meets a predefined criteria, the line quality is judged to be adequate. The average signal amplitude of the DTMF tones is also compared with a predefined threshold value, and a checksum calculation is performed to check for the loss or corruption of data (i.e., DTMF tones). It should be noted that both the transmitting and the receiving VMS perform these tests on each "packet" of DTMF tones which it receives.

Checksum. Each packet of DTMF tones has a predefined number of DTMF tones. As shown in FIG. 3, each packet includes two tones CK1 and CK2 at the end of the packet which serve as a "checksum". Since each DTMF signal represents a four-bit binary value, the two checksum signals together form an eight bit checksum value. The checksums are generated using a conventional checksum algorithm, and they are used for the standard purpose: to enable the receiver to verify that value (i.e., DTMF tones) transmitted has been properly received. If the receiving system computes a checksum that does not match the checksum received, the receiver concludes that transmitted signal has been corrupted and therefore does not accept the transmission. In the context of this invention, the receiver terminates the call, forcing the transmitter to restart the call using a new telephone connection.

Signal Sampling. FIG. 3 schematically depicts the method of testing a telephone line's signal to noise ratio. The DTMF tones are transmitted in accordance with the standard requirement that each DTMF signal have a duration of at least 40 milliseconds, and that there be a period of at least 40 milliseconds between DTMF signals. The receiving VMS samples the incoming signal approximately once every 10 milliseconds. When a DTMF signal is detected, three signal parameters are generated for each DTMF signal received: TONE, HI, and LO. The TONE parameter represents the binary value of the DTMF signal (i.e., a value between 0 and 15), HI represents the average amplitude of the two highest value samples during the DTMF signal, and LO represents the average amplitude of two lowest samples values during the thirty milliseconds immediately preceding the onset of the DTMF signal. The HI value is therefore a measurement of the signal level of the DTMF tones being received, and the LO value is a measurement of the amount of noise on the line.

As shown in FIG. 3, a complete packet is represented by an array 34 of TONE, HI and LO values for the set of DTMF tones which make up the packet.

S/N Test. After a complete packet has been received, the line's signal to noise ratio S/N (for the period of time during which the packet was being received) is computed according to the formula:

$$S/N = \frac{\text{Average Signal Amplitude of } DTMF \text{ signals}}{\text{Average Silence Amplitude of Periods Before } DTMF \text{ signals}}$$

where the average signal amplitude is the average of the HI signal values for the packet, and the average silence amplitude is the average of the LO values for the packet.

If the signal to noise ratio of the telephone line computed in this manner is below a predefined threshold value, the call is terminated. Note that since both VMS systems are performing the signal to noise ratio test on each DTMF tone received, either VMS may terminate the call. This approach is used because the quality of a telephone connection may not be the same in both directions.

If the call is terminated because of poor line quality, the transmitting system repeats the initial call sequence—calling the other system, and performing the line quality test while performing the handshake protocol—until a line with acceptable line quality is found.

Echo Detection

The present invention comprises an improved system and method for testing line quality at the beginning of a message transmission operation. In particular, the present invention addresses the problem that line echoes may substantially corrupt a transmitted message even though the line passed the signal to noise ratio test in the prior art system. Telephone line echoes are typically associated with improperly terminated lines, which may occur at virtually any point in the series of connections between two VMS systems.

Another problem with line echoes, in addition to message degradation, is that echoes of DTMF signals (i.e., transmitted by the receiving VMS) can be mistaken by the receiving VMS for the DTMF signals that specify the recipient of the following message. Any chance of misdirecting a message is not acceptable.

Unfortunately, the use of the two checksum signals CK1 and CK2 shown in FIG. 3 do not totally eliminate this problem. In fact, the inventor has calculated that the chances of a DTMF packet containing one or more DTMF echoes being accepted as a genuine packet (i.e., the chances that the checksum for the corrupted packet would be correct) are approximately 1 in 30,000 in the preferred embodiment. In other words, if one or more echoes (of previously sent DTMF signals) are received before the genuine DTMF signals are received, these echoes will be treated as the beginning of the packet. Since each packet has a predefined number of tones, the system will collect that number of tones (starting with the echo tones) and then will compute the checksum for that packet. It is a known fact, however, that even randomly generated numbers will occasionally satisfy a checksum calculation. Furthermore, while using additional checksum signals would reduce the chances of a DTMF echo being accepted as part of a signal packet, it would not reduce those chances to zero.

The present invention was developed to totally eliminate the chance that line echoes could result in the misdirecting of a message. Furthermore, the present invention can distinguish between line echoes and the beginning of a transmitted packet, and can therefore identify the actual beginning of a transmitted packet so that the information transmitted is not lost.

As described above, the handshake protocol involves the transmission of DTMF signals by both the transmitting VMS and the receiving VMS. Since each VMS responds to the DTMF signals of the other VMS with another set of DTMF signals, it is important for each VMS to be able to distinguish authentic DTMF signals (sent by the other VMS) from echoes of DTMF signal previously sent by itself.

In the present invention, each VMS tests the quality of the telephone line being used by checking both the signal to noise ratio, as described above, and by checking for line echoes. The test for telephone line echoes is designed to eliminate the possibility that the "echoes" are actually signals sent by the receiving station back to the transmit ting station. As in the prior art system, if the telephone line fails the line quality tests, the call is terminated and then the transmitting system attempts to find a line with acceptable line quality.

It is therefore a primary object of the present invention to provide an improved telephone line quality testing system and method, which detects line echoes.

Another object of the present invention is to automatically check the signal to noise ratio a telephone connection, while simultaneously checking for line echoes, before the transmission of stored messages from one location or system node to another.

SUMMARY OF THE INVENTION

In summary, the present invention is a line quality testing system for detecting line echoes in the telephone connection between two subsystems in a message transmission system. The test for line echoes is performed during the handshake protocol for establishing a connection between two subsystems, before stored messages are transmitted from one subsystem to the other. During the handshake protocol the two subsystems exchange identification data by transmitting DTMF signals in a predefined sequence.

Each subsystem performs two tasks as part of the echo detection procedure. First, it facilitates echo detection by the other subsystem by transmitting a marker or header at the beginning of each DTMF transmission. This marker is constructed so that it can be distinguished, with absolute certainty, from any possible echo of the previous DTMF transmission by the other subsystem. In particular, in the preferred embodiment the marker comprises two distinct DTMF signals selected, in accordance with a predefined algorithm, from the set of DTMF signals not included in the last X DTMF signals sent by the other subsystem, where X is less than fifteen.

Second, each subsystem also generates an "expected marker" that should precede the next DTMF transmission by the other subsystem, using the said predefined algorithm as it uses for generating the marker at the beginning of its own DTMF transmissions. Thus, when receiving a DTMF transmission, each subsystem compares the initial DTMF signals received with the expected marker. If the received signals do not match the expected marker the received signals may be a line echo. The system therefore ignores signals which do not match the expected marker until either the expected marker is received, or the number of signals received reaches a predefined limit. If the expected marker is eventually received, the marker is treated as the beginning of a new packet and the previously received signals are ignored. If the number of signals received reaches the predefined limit before receiving the expected marker, the call is terminated.

In the preferred embodiment, each subsystem generates a marker by using a small buffer to keep track of the last fourteen signals received from the other subsystem. Then it selects two DTMF tones that were not included in the fourteen DTMF signals last sent by the other subsystem.

At the same time that each subsystem checks for line echoes, it also checks the signal to noise ratio of the line, the signal level of the line, and the checksum of the packet. If the line fails any of these tests, the call is terminated. Then the transmitting system repeats the initial call sequence—calling the other system, and performing the line quality tests while performing the handshake protocol—until a line with acceptable line quality is found.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENT

Figure 1:
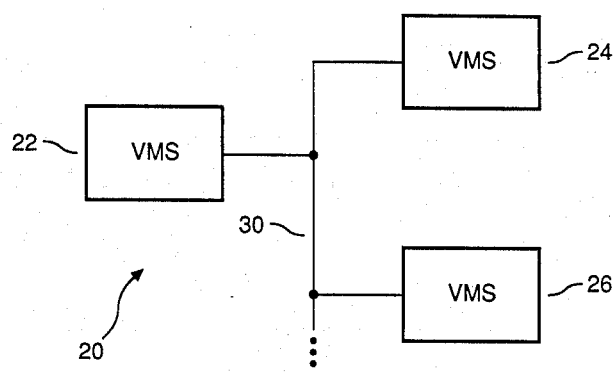
FIG. 1 is a block diagram of a message transmission system including a plurality of voice message systems which are interconnected by telephone lines.

Referring to FIG. 1, the preferred embodiment of the present invention is a line quality testing system which is used in a message transmission system 20. The above description of the voice message system 20, and FIGS. 1 through 3 also apply to the system in which the preferred embodiment is used.

Figure 2:
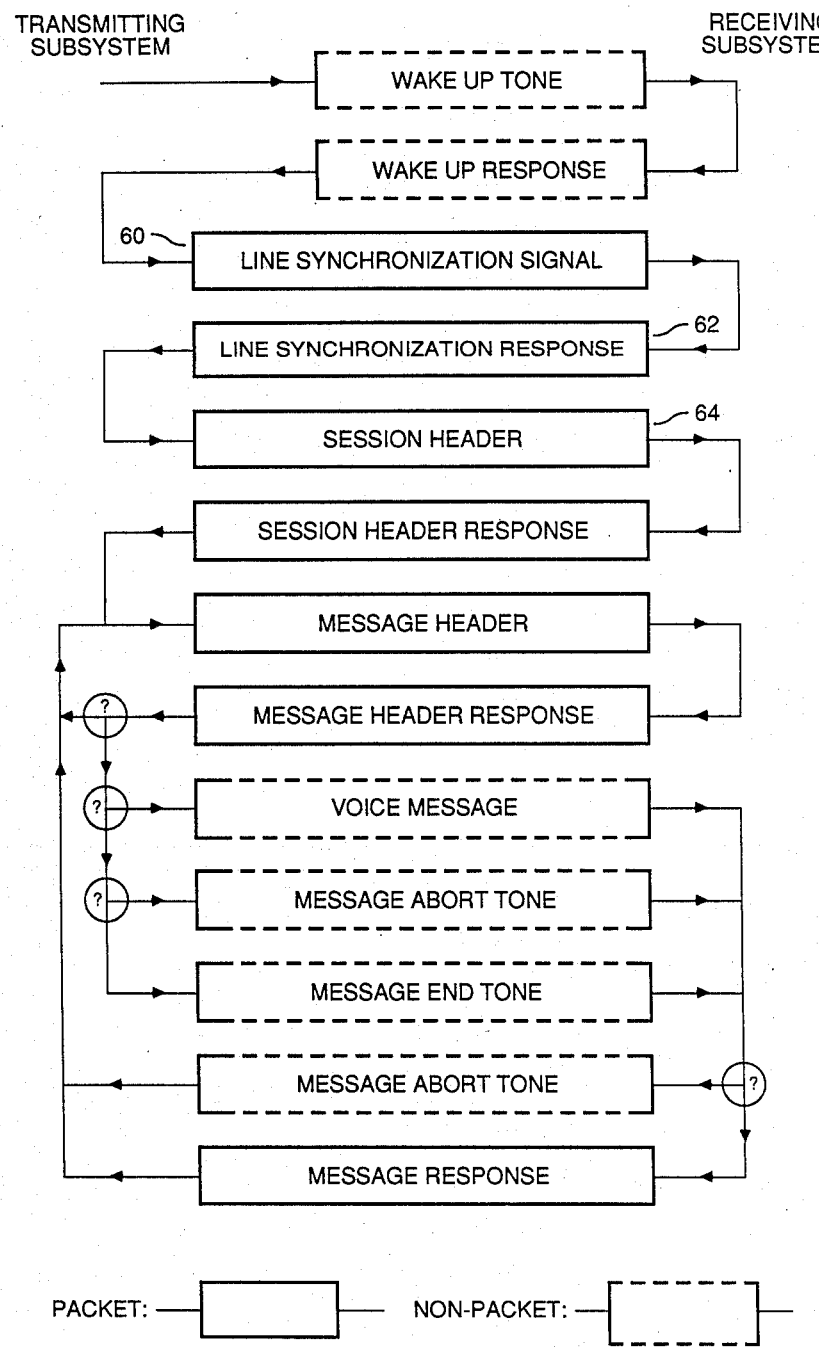
FIG. 2 is a flow chart which schematically represents the sequence of signals sent when one VMS first calls another VMS.

In the preferred embodiment, the procedure for detecting line echoes is performed during the execution of the handshake protocol shown in FIG. 2. Further, the line quality testing system in the preferred embodiment includes the method of testing a telephone line's signal to noise ratio described above with reference to FIG. 3.

By performing both of these line quality tests, the present invention provides an improved system for detecting poor quality telephone line connections that would significantly degrade the transmission of messages from one subsystem to another.

Figure 4:
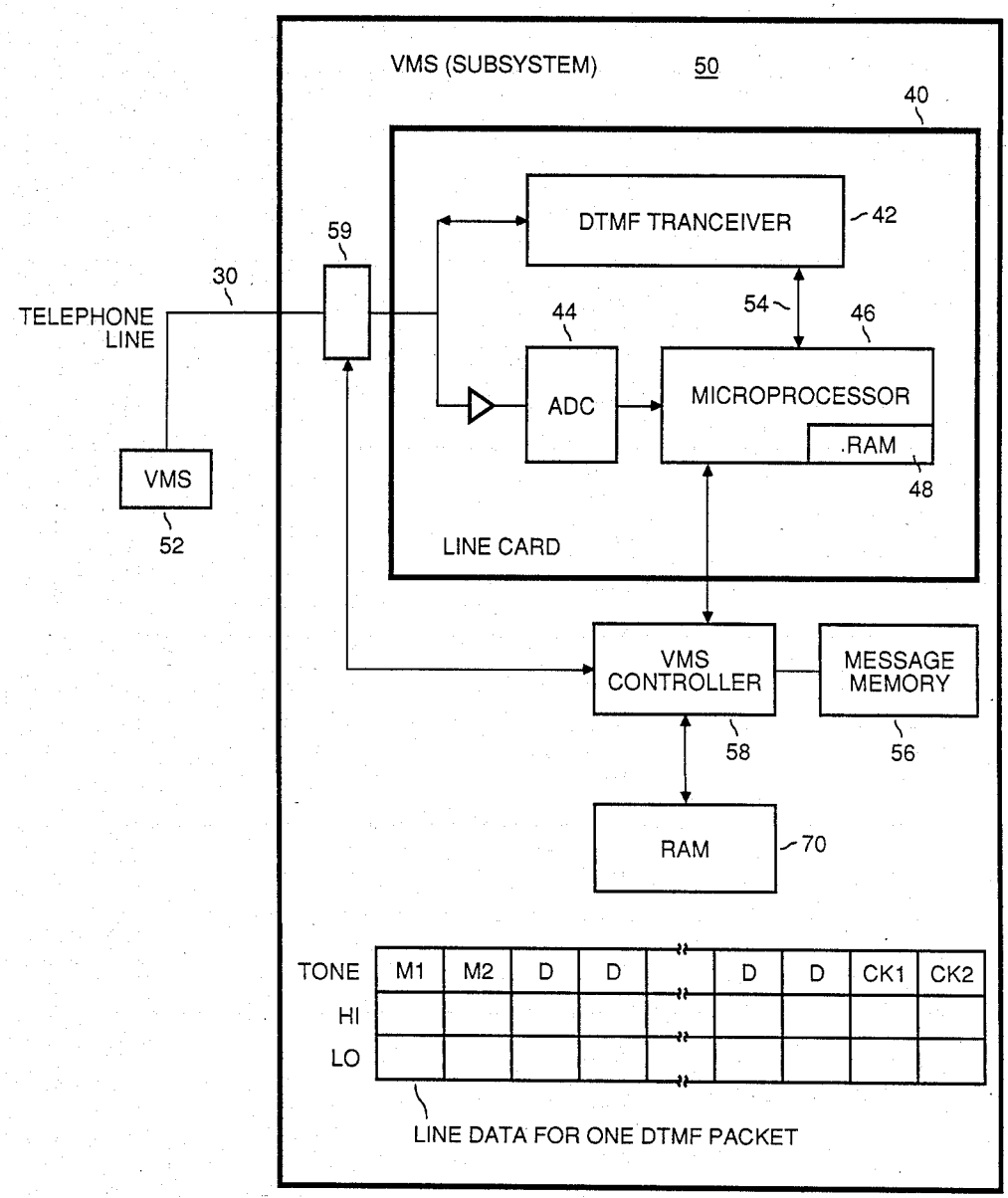
FIG. 4 is a block diagram of the apparatus used for receiving a signal from a telephone line and for evaluating the quality of the transmissions over the telephone line being used.

Referring to FIG. 4, there is shown a block diagram of a line quality testing system 40, also called a "line card", in accordance with the present invention. The line quality testing system evaluates the quality of transmissions sent over the telephone line 30 connecting two subsystems 50 and 52 in a voice message transmission system. The line quality testing system 40 also distinguishes between echoes and authentic DTMF signals sent by the other subsystem 52, and thereby eliminates the possibility that message could be misrouted by a DTMF signal echo.

The testing system 40 includes a standard DTMF transceiver 42 for receiving and decoding DTMF signals on the telephone line 30, and for transmitting DTMF signals to the other subsystem at the other end of the telephone line connection. The DTMF transceiver 42 is also used for dialing the telephone number of another subsystem when initiating a telephone connection.

The testing system 40 also includes an analog to digital converter (ADC) 44 for measuring the amplitude of signals on the telephone line 30, and a microprocessor 46. The microprocessor 46 controls the testing system 40 and is programmed to detect echoes, compute and check the signal to noise ratio of the telephone connection 30, and to perform checksum calculations on DTMF packets. In the preferred embodiment, the testing system 40 is a component of a voice message system 50 which includes a message memory 56, a controller 58 and a telephone line interface 59.

Echo Detection

Referring to FIG. 2, the handshake protocol for setting the transmission of messages from one subsystem to another includes several transmissions which are herein called DTMF packets, as well as several transmissions which are not DTMF packets. The DTMF packets are represented by rectangular boxes with solid outlines, and the other transmissions are represented by boxes with dashed outlines. Substantively, the DTMF packets each comprise a sequence of at least four DTMF tones, typically having between ten and forty DTMF tones. The non-packet transmissions comprise either a single tone or a voice message transmission. In the preferred embodiment, the voice messages are transmitted in analog form, but voice messages are transmitted in digitized form in many other systems. Distinct DTMF tones are used for the Wake Up Tone, the Message Abort Tone and the Message End Tone shown in FIG. 2.

For the purposes of this invention, the content and meaning of the DTMF packets (e.g., packets 60 and 62 in FIG. 2) are of no importance. What is important to the present invention is how a "marker" is added to these DTMF packets so that the subsystem receiving each packet can distinguish such packets from line echoes of the previously transmitted packet, with absolute certainty.

The theory of operation used in the echo detection procedure of the present invention is as follows. When a sequence of DTMF tones is transmitted from one subsystem to a second subsystem, such as from subsystem 22 to subsystem 24 in FIG. 1, these DTMF tones may be reflected back to the first subsystem. The typical cause of such line echoes is an improper line termination somewhere in the telephone connection between the two subsystems. In some situations there can be more than one improper line termination in the telephone connection, resulting in "multipoint" echoes. However, the present invention effectively detects line echoes regardless of their cause.

Another factor in detecting line echoes is knowing the longest possible period between the transmission of the original DTMF signal and the receipt of its echo. The inventor has determined that the "round trip" transmission of such echoes is virtually never greater than one second, even for telephone connections going halfway around the earth. Much more typically, the transmission time for echoes is between 0.1 and 0.5 seconds.

Since the maximum number of DTMF tones which can be transmitted in a one second period is thirteen (where each tone has a duration of 0.040 seconds and silent period of 0.040 seconds between tones), the echo detector in each subsystem must be able to distinguish between a transmission from the other subsystem and an echo of any of the last thirteen or so DTMF tones which it last transmitted to the other subsystem.

It should also be noted that there are sixteen standard DTMF tones generated by standard DTMF signal generators. The present invention detects line echoes by having each subsystem add a marker or header to each DTMF packet. The marker, which is transmitted at the beginning of each packet, comprises two DTMF tones which were not used in the last fourteen tones received by the subsystem.

In the preferred embodiment, the two DTMF tones used in the marker are the two DTMF tones, not used in the last fourteen tones received by the subsystem, with the lowest binary values. However, as will become apparent from the discussion below, the most important aspect of the method of selecting the marker tones is that it be predefined so that the subsystem receiving the packet will be able to predict the marker that should be generated by the subsystem transmitting the packet.

Figure 5:
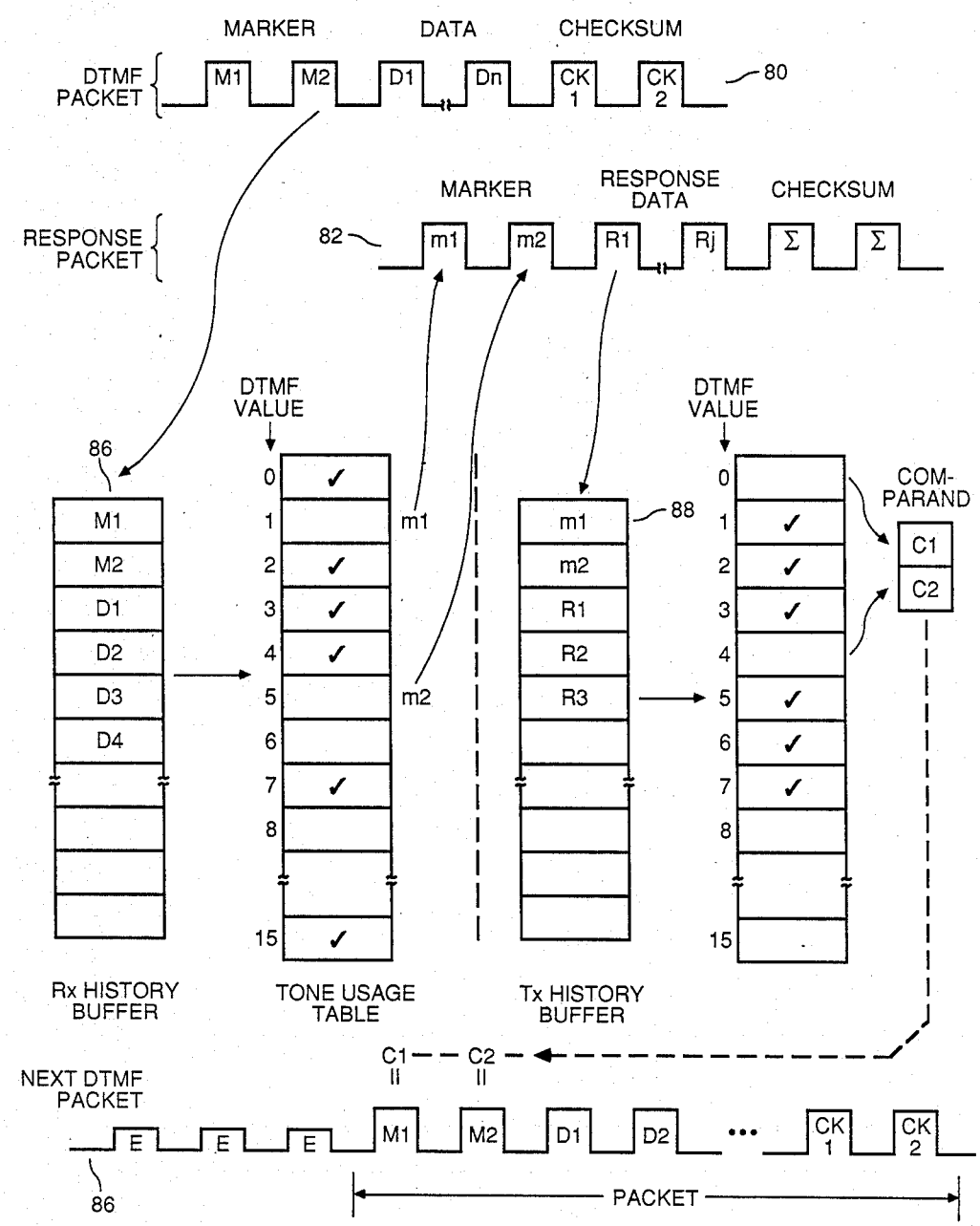
FIG. 5 schematically depicts a first sequence of DTMF signals, a data structure for denoting the DTMF signals used in that sequence, and a responsive sequence of DTMF signals.

FIG. 5 schematically depicts a sequence of DTMF packets 80-84 and the data structures used by one subsystems for processing these packets. Each subsystem uses a data structure called the Rx History Buffer 86 for storing the DTMF signals that is receives, and a Tx History Buffer 88 data structure for storing the DTMF signals in the responsive sequence. FIG. 5 also schematically depicts a data structure called the Tone Usage Buffer 90 for determining the markers to be used at the beginning of the DTMF packets.

The DTMF packets 80-84 in FIG. 5 correspond to packets in the handshake protocol - such as packets 60-64 in FIG. 2. The first two tones in each packet, denoted M1 and M2 in packet 80, and denoted in m1 and m2 in packet 82, are the marker or header at the beginning of the packet.

For the purposes of the immediate discussion, assume that packet 80 in FIG. 5 is being received by the Receiving Subsystem in FIG. 2. Also, for reasons which will be explained in more detail below, assume that when the Receiving Subsystem received the Wake Up Tone as shown in FIG. 2, that it writes fourteen copies of that DTMF tone value into its Rx History Buffer 86. Similarly, the Transmitting Subsystem writes fourteen copies of the Wake Up Response tone into its Rx History Buffer 86.

As packet 80 is received by the Receiving Subsystem, the DTMF tones are decoded by the DTMF transceiver 42 (in FIG. 4), and stored in the Rx History Buffer 86. When it is time for the Receiving Subsystem to send a Response Packet to the Transmitting Subsystem, it generates a marker for that packet as follows. First it clears (i.e., loads zeros into) the Tone Usage Buffer 90, which contains sixteen slots - one for each of the sixteen standard predefined DTMF tones. Then it inspects the last fourteen entries in the Rx History Buffer 82 and marks each corresponding slot in the Tone Usage Buffer 90. If some of these fourteen entries have matching values, less than fourteen of the slots in the Tone Usage Buffer 90 will be marked.

The slots in the Tone Usage Buffer 90 which remain equal to zero denote the DTMF tones not used in the last fourteen tones received from the other subsystem. The marker at the beginning of the Response Packet 82 is formed by selecting the first two slots in the Tone Usage Buffer 90 with values of zero, and then generating the corresponding DTMF tones.

When a Response Packet 82 is transmitted, the Receiving Subsystem (which is now transmitting data) stores the decoded values of the DTMF tones in that packet in a data structure called the Tx History Buffer 88. The values in this buffer 88 are used for generating the marker that it expects to receive back from the other subsystem. In other words, the Receiving Subsystem generates a "comparand" marker, using the same procedure as it uses for generating the marker at the beginning of the Response Packet. The comparand marker is equal to the marker that the other subsystem will generate if it properly receives the Response Packet. If the telephone connection 30 between the two subsystems is adequate, the comparand marker will match the first two tones of the next DTMF packet received from the other subsystem.

In this case, the data for generating the comparand marker are the last fourteen signals stored in the Tx History Buffer 88. The Tone Usage Buffer 90 is cleared and then marked with the last fourteen entries in the Tx History Buffer. The comparand is set equal to the two DTMF tones corresponding to the unmarked slots in the Tone Usage Buffer 90 with the lowest binary values.

After the Receiving Subsystem has transmitted its Response Packet 84, it listens and waits for another DTMF Packet 84 from the other subsystem. When DTMF signals are received, these signals are compared with the comparand marker that was previously computed. In particular, each DTMF signal received is compared with the first comparand value C1 until a received DTMF tone matches C1. Then the next tone received is compared with comparand C2. If these do not match, or if none of the first fifteen tones received match C1, an error signal is generated (to inform the VMS controller 58 that a line quality problem has been detected) and the call is terminated because either of these circumstances indicates the presence of a significant line quality problem. By terminating the call, the Transmitting Subsystem is forced to try to find a telephone connection with better line quality.

Any echo tones (see E tones preceding packet 84 in FIG. 5) received before the marker tone equal to C1, at the actual beginning of the packet received from the other subsystem, are ignored. Thus, the line data (TONE, HI, and LO) 32 for the packet 84 will not include any data for the echo tones, and the echo tones will not affect the subsequent signal to noise and checksum tests.

In alternate embodiments of the invention, the marker used could contain just one DTMF signal, or more than two DTMF tones, depending on the required sensitivity of the echo detection procedure. Furthermore, a variety of different procedures could be used to select the marker signal, so long as the marker comprises at least one DTMF tone selected from the set of DTMF tones not used in at least a predefined portion of the last received packet.

S/N Ratio Test

The procedure for performing the signal to noise ratio test, using the apparatus in FIG. 4, is as follows. The amplitude of the signal, if any, on the telephone line 30 is sampled by the ADC once every 10 milliseconds. The resulting values are stored in a ring buffer (i.e., a data structure in the microprocessor's memory 48) having a capacity of ten data values.

When the transceiver 42 detects the presence of a DTMF tone on the telephone line 30, it sends a Valid_DTMF signal on line 54 to the microprocessor 46. Due to the operating characteristics of the transceiver 42, the Valid_DTMF signal is not sent until the DTMF signal has been present on the telephone line 30 for at least 25 to 30 milliseconds. Thus, when the Valid_DTMF signal is received by the microprocessor 46, the ring buffer will already contain sufficient data samples for computing the S/N ratio of the telephone line. See FIG. 3.

Figure 3:
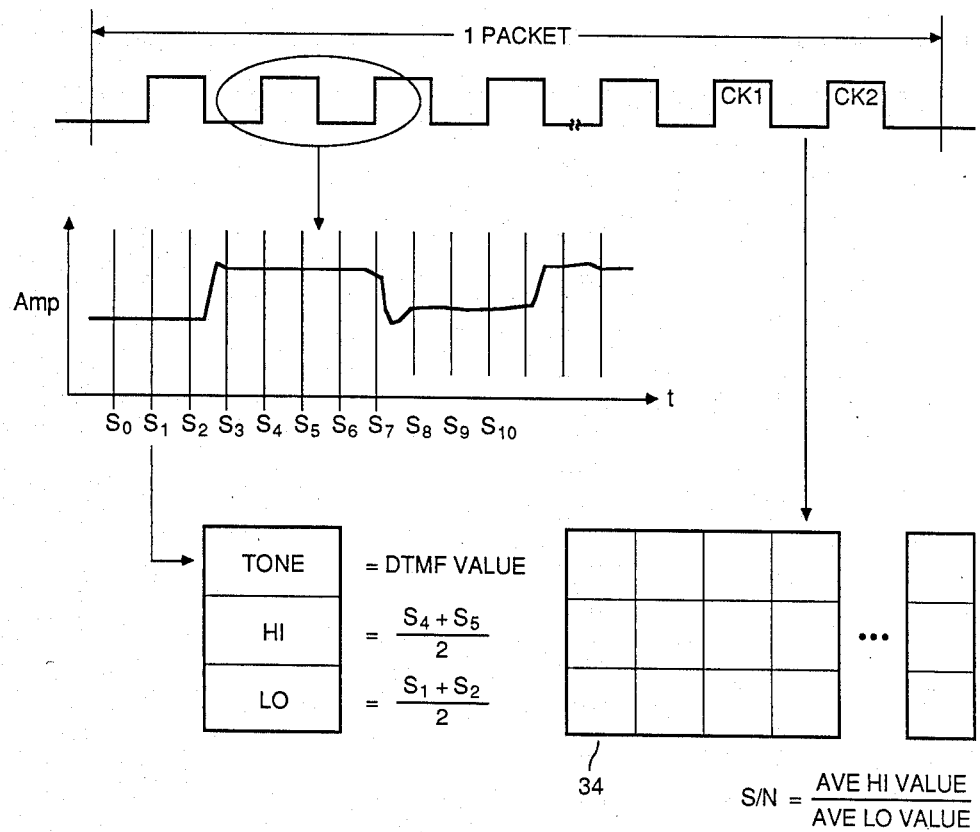
FIG. 3 schematically depicts a method of testing a telephone line's signal to noise ratio.

Referring to FIG. 3, the microprocessor 46 is therefore programmed to respond to the occurrence of the Valid_DTMF signal by computing an average signal value (HI), and an average noise value (LO) corresponding to the average signal amplitudes during the DTMF tone and just before the DTMF tone:

$$HI = \frac{S4 + S5}{2}$$

$$LO = \frac{S1 + S2}{2}$$

As shown in FIG. 3, a complete DTMF packet is represented by an array 34 of TONE, HI and LO values for the set of DTMF tones which make up the packet. Also, as explained in the discussion of FIG. 5, the array 34 does not include data for echo tones.

In other embodiments of the invention, where the Valid_DTMF signal can occur at an earlier point during each DTMF tone, the microprocessor can be programmed to compute the signal (HI) and noise (LO) values for a DTMF tone upon the storage of the next line signal sample after the occurrence of the Valid_DTMF signal.

After a complete packet has been received, the line testing system 40 performs three tests: a signal level test, a signal to noise threshold test, and a checksum. It should be noted that both the transmitting and the receiving subsystems (e.g., 50 and 52 in FIG. 4) perform these tests on each "packet" of DTMF tones which it receives, and either subsystem can cancel the call if it determines that a significant line quality problem has been detected.

The signal level test is performed by computing the average of the signal amplitude (HI) values for the packet, and comparing that average value with a predefined threshold value. The checksum test is a checksum calculation, described above with reference to FIG. 3, which checks for the loss or corruption of data (i.e., DTMF tones).

The line's signal to noise ratio S/N (for the period of time during which the packet was being received) is computed according to the formula:

$$S/N = \frac{\text{Average Signal Amplitude of } DTMF \text{ signals}}{\text{Average Silence Amplitude of Periods Before } DTMF \text{ signals}}$$

where the average signal amplitude is the average of the HI signal values for the packet, and the average silence amplitude is the average of the LO values for the packet. If the signal to noise ratio of the telephone line computed in this manner is below a predefined threshold value, the call is terminated.

If the call is terminated because of poor line quality, the transmitting system repeats the initial call sequence—calling the other system, and performing the line quality test while performing the handshake protocol—until a line with acceptable line quality is found.

Each subsystem (e.g., 50 and 52) independently performs this test on every DTMF tone received, and either subsystem can cancel the call if it determines that the line's signal to noise ratio is too low.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A telephone line quality testing system for use in a message transmitting system having at least two subsystems which can be interconnected by a telephone connection, each subsystem having message storage means for storing messages, said telephone line quality testing system comprising:

call initiating means in a first subsystem for establishing a telephone connection with a second subsystem;

communication protocol means in the first subsystem coupled to said telephone connection for transmitting packets of DTMF tones to the second subsystem via the telephone line connection, and for receiving DTMF tones transmitted by the second subsystem via the telephone connection;

response generating means in the second subsystem coupled to said telephone connection for receiving packets of DTMF tones transmitted by the first subsystem, and for responding to each said packet by transmitting a responsive packet of DTMF tones, said responsive packet including a marker comprising at least one DTMF tone selected from the set of DTMF tones not used in at least a predefined portion of the DTMF tones received from said first subsystem; and echo detection means in the first subsystem coupled to said communication protocol means in the first subsystem for generating a comparand identical to the marker which the second subsystem would generate if the second system properly received the last packet sent to it, and for generating an error signal if said comparand does not match a predefined portion of the DTMF tones received from the telephone connection.

2. The telephone line quality testing system of claim 1, wherein said marker generated by said response generating means includes at least two DTMF tones selected from the set of DTMF tones not used in last X DTMF tones received from the first subsystem, where X is less than fifteen.

3. The telephone line quality testing system of claim 1, wherein said echo detection means includes means for comparing said comparand with each DTMF tone received from the telephone connection and for denoting a DTMF tone as the beginning of a packet of received DTMF tones when a match is found, and means for generating an error signal when a match is not found with said comparand in at least a predefined initial portion of the DTMF tones received from the telephone connection.

4. The telephone line quality testing system of claim 1, further including:
signal to noise ratio detection means in at least one of the subsystems, including amplitude detection means coupled to said telephone connection for measuring the amplitude of signals received from the telephone connection, ratio generating means coupled to said amplitude detection means for generating a line quality value corresponding to the ratio of the amplitude of the signals received from the telephone connection while receiving DTMF tones and the amplitude of the signal received from the telephone connection between DTMF tones, and ratio testing means coupled to said ratio generating means for generating an error signal when said line quality value is less than a predefined threshold value.

5. A telephone line quality testing system for use in a message transmitting system having at least two subsystems which can be interconnected by a telephone connection, each subsystem having message storage means for storing messages, said telephone line quality testing system comprising:
call initiating means in a first subsystem for establishing a telephone connection with a second subsystem;
first and second communication protocol means in the first and second subsystems, respectively, each said communication protocol means coupled to said telephone connection for transmitting packets of DTMF tones to the other subsystem via the telephone line connection, and for receiving DTMF tones transmitted by the other subsystem via the telephone connection;
first and second marker generating means in the first and second subsystems, respectively, each said marker generating means coupled to said telephone connection for receiving packets of DTMF tones transmitted by the other subsystem, and for responding to at least one of said received packets by generating a marker to be transmitted to the other subsystem as part of the next packet to be sent to the other subsystem, said marker comprising at least one DTMF tone selected from the set of DTMF tones not used in at least a predefined portion of DTMF tones received from the other subsystem; and
first and second echo detection means in the first and second subsystems, respectively, each said echo detection means coupled to said communication protocol means in the same subsystem for generating a comparand identical to the marker which the other subsystem would generate if the other system properly received the last packet sent to it, and coupled to said telephone connection for receiving DTMF tones transmitted by the other system and for generating an error signal if said comparand does not match a predefined portion of the DTMF tones received from the telephone connection.

6. The telephone line quality testing system of claim 5, wherein said markers generated by each of said marker generating means includes at least two DTMF tones selected from the set of DTMF tones not used in said portion of said DTMF tones received from the other subsystem; said predefined portion being defined so that the number of different DTMF tones in said predefined portion is less than fifteen.

7. The telephone line quality testing system of claim 6, wherein each said echo detection means includes means for comparing said comparand with each DTMF tone received from the telephone connection and for denoting a DTMF tone as the beginning of a packet of received DTMF tones when a match is found, and means for generating an error signal when a match is not found with said comparand in at least a predefined initial portion of the DTMF tones received from the telephone connection.

8. The telephone line quality testing system of claim 6, wherein
each said packet of DTMF tones includes a marker at its beginning and a checksum comprising at least one checksum tone generated, by the subsystem which transmits said packet, by performing a predefined checksum calculation on the DTMF tones in said packet; and
said first and second subsystems each includes checksum checking means for calculating a checksum for each packet of received DTMF tones using said predefined checksum calculation, and means for generating an error signal if the checksum calculated does not match said checksum in said packet.

9. A method of testing telephone line quality for use by a message transmitting system having at least two subsystems which can be interconnected by a telephone connection, each subsystem having message storage means for storing messages, the steps of method comprising:
establishing a telephone connection between a first subsystem and a second subsystem;
transmitting at least one packet of DTMF tones from the first subsystem to the second subsystem via said telephone connection;
responding to at least one of said packets transmitted by the first subsystem, when received by the second subsystem, by transmitting a responsive packet of DTMF tones from the second subsystem to the first subsystem via said telephone connection, said responsive packet including a marker comprising at least one DTMF tone selected from the set of DTMF tones not used in at least a predefined portion of the DTMF tones received from the first subsystem;
generating a comparand identical to the marker which would be generated if the second subsystem properly received the last packet sent by the first subsystem to the second subsystem; and
generating an error signal for use by the first subsystem if said comparand does not match a predefined portion of the DTMF tones received by the first subsystem from the telephone connection.

10. The line quality testing method of claim 9, wherein said marker generated by said responding step includes at least two DTMF tones selected from the set of DTMF tones not used in said predefined portion of said received DTMF tones; said predefined portion of said received packet being defined so that the number of different DTMF tones in said predefined portion is less than fifteen.

11. The line quality testing method of claim 9, wherein said method includes comparing said comparand with each DTMF tone received from the telephone connection and for denoting a DTMF tone as the beginning of a packet of received DTMF tones when a match is found, and generating an error signal when a match is not found with said comparand in at least a predefined initial portion of the DTMF tones received from the telephone connection.

12. The line quality testing method of claim 9, wherein each said packet of DTMF tones includes a marker at its beginning and a checksum comprising at lest one checksum tone generated, by the subsystem which transmits said packet, by performing a predefined checksum calculation on the DTMF tones in said packet; and said method includes a checksum checking step comprising the steps of calculating a checksum for each packet of received DTMF tones using said predefined checksum calculation, and means for generating an error signal if the checksum calculated does not match said checksum in said packet.

* * * * *